June 13, 1950 — S. T. CURRAN ET AL — 2,511,622

TELEPHONE SUBSTATION APPARATUS

Filed Jan. 17, 1948 — 2 Sheets-Sheet 1

INVENTORS: S. T. CURRAN
W. J. THAYER

BY [signature]

ATTORNEY

June 13, 1950 S. T. CURRAN ET AL 2,511,622

TELEPHONE SUBSTATION APPARATUS

Filed Jan. 17, 1948 2 Sheets-Sheet 2

INVENTORS: S. T. CURRAN
W. J. THAYER

BY [signature]

ATTORNEY

Patented June 13, 1950

2,511,622

UNITED STATES PATENT OFFICE 2,511,622

TELEPHONE SUBSTATION APPARATUS

Stanley T. Curran, Mountain Lakes, N. J., and Walter J. Thayer, Arlington, Vt., assignors to Bell Telephone Laboratories, Incorporated, New York, N. Y., a corporation of New York Application January 17, 1948, Serial No. 2,867

2 Claims. (Cl. 179—100)

This invention relates to telephone substation apparatus and more particularly to wall mountings for hand telephones.

One object of this invention is to reduce the size, particularly the thickness, of wall mountings for hand telephones, whereby the distance which the set projects from a wall or other mounting surface is minimized.

Another object of this invention is to simplify the construction and to facilitate the manufacture of wall mountings for hand telephones.

A further object of this invention is to reduce the strain in the switchhook operated contact spring in such mountings during the periods when the hand telephone is in position thereon.

In one illustrative embodiment of this invention, a wall mounting for a hand telephone comprises a housing adapted for attachment to a vertical wall or surface and enclosing the usual substation instrumentalities such as a ringer, condenser and induction coil. A rockable hook member for accommodating a hand telephone projects from the front of the housing and serves to actuate contact springs within the housing when the hand telephone is placed upon the hook member.

In accordance with one feature of this invention, the contact springs are of the leaf type and are positioned to be deflected in directions parallel to the rocking axis of the hook member, and a coupling is provided between the hook member and springs for translating rocking motion of the hook member into amplified motion of the springs in the direction normal to the motion of the hook member and substantially parallel to the front wall of the housing.

In accordance with another feature of this invention, the contact spring assembly, the coupling and the support for the hook member are fabricated as a compact assembly mountable as a unit upon the inner surface of the front wall of the housing, the unitary assembly being of small dimension normal to the wall.

In accordance with a further feature of this invention, an auxiliary spring, separate from the contact springs is provided in association with the coupling aforenoted to oppose rocking of the hook member when the hand telephone is placed upon the latter and to rock this member when the hand telephone is removed therefrom.

The invention and the above-noted and other features thereof will be understood more clearly and fully from the following detailed description with reference to the accompanying drawing in which.

Figure 1:
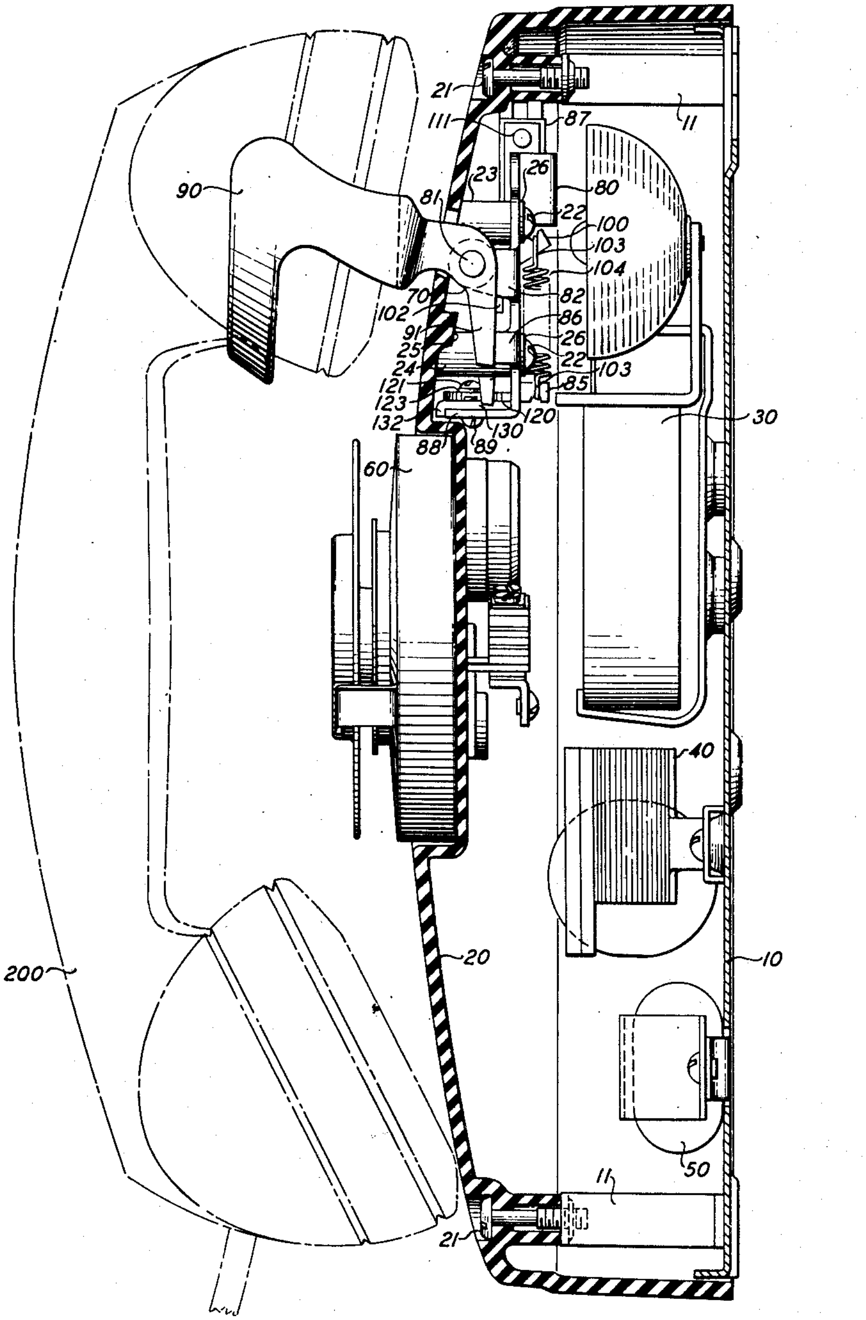
Fig. 1 is a side elevational view of a wall telephone including a mounting illustrative of one embodiment of this invention, the mounting being shown partly in section and the hand telephone being shown in broken outline.

Referring now to the drawings, the wall mounting for a hand telephone, therein illustrated comprises a housing including a base portion 10 and a removable cover 20 which is held in place on base portion 10 by screws 21 which thread into studs 11 on base 10. The cover may be of metal or of an insulating material such as a phenolic condensation product and advantageously is designed with all its outer faces tapering in the same direction so that the cover may be cast or molded in a single piece. Base 10 may be a metallic plate. Ringer 30, induction coil 40 and condenser 50 are suitably attached to base 10 by screws. Calling dial 60 is mounted on cover 20 in a depression substantially at the center of the face thereof, part of the mechanism of calling dial 60 being within the housing when cover 20 is in place on base 10.

Figures 2, 3, 4:
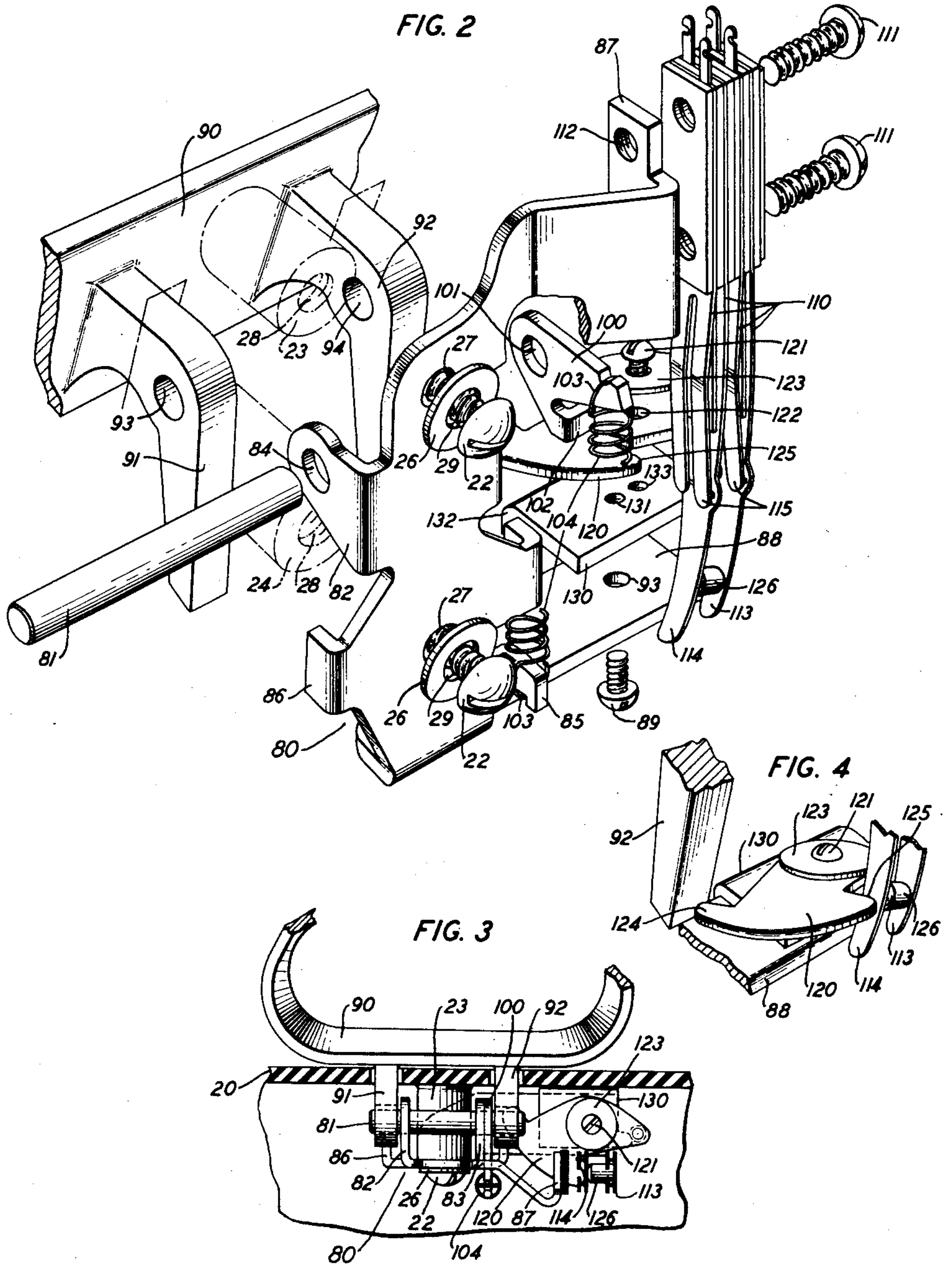
Fig. 2 is an exploded perspective view showing the components of the hook and contact spring assembly.
Fig. 3 is a plan view of the assembly shown mounted on the inner face of the housing front wall which is shown in section.
Fig. 4 is an enlarged fragmentary view of the lower end portion of the switchhook operating finger showing its relation to the cam which transmits motion from this finger to the free ends of the contact springs of which only the lower portions are shown.

A unitary assembly, shown partly exploded in Fig. 2 and comprising a bracket generally designated as 80, is mounted within the casing on two mounting lugs 23, 24 on the inner face thereof and held in place thereon by screws 22, which pass through clearance holes 29 in washers 26 and clearance holes 27 in bracket 80 into threaded holes 28 in lugs 23, 24. The bracket 80 has two forward projecting parallel extensions 82, 83 which are bored with two aligned holes 84 which support shaft 81 in a horizontal position. Hook 90 has two parallel angular downwardly projecting fingers 91, 92 which are bored with two aligned holes 93, 94 through which shaft 81 is inserted as a pintle. Dog 100 has a hole 101 traversed by shaft 81. Angular projection 102 on dog 100 engages the downwardly projecting portion of finger 92 of hook 90. Bracket 80 has a rearward angular projection 85. Coiled tension spring 104 has looped ends 103 which engage notches in dog 100 and angular extension 85. Hook 90 is rockable on shaft 81 and is limited in its motion in one direction by finger 91 of hook 90 striking angular extension 86 on bracket 80 as a top, and limited in its movement in the other direction by finger 91 striking angular extension 25 as a stop which may be cast on the inner face of cover 20. When hook 90 is supporting a handset indicated at 200 in Fig. 1, finger 91 engages angular extension 86 and finger 92 presses against angular extension 102 which rocks dog 100 on shaft 81 and extends tension spring 104. When the handset is removed from hook 90, the tension of spring 104 rocks dog 100 and presses angular extension 102 against finger 92, whereby hook 90 rocks on shaft 81 to a position with finger 91 engaging angular extension 25 as a stop.

An angular extension 87 on bracket 80 supports a set of contact springs 110, which are attached to angular extension 87 by screws 111 which thread into holes 112 therein. Two springs extend downward with end portions 113, 114. Angular bracket 130 is attached to a horizontal angular extension 88 of bracket 80 by screw 89 which is inserted through clearance hole 93 in angular extension 88 into threaded hole 131 in bracket 130.

Screw 89 together with the downward angular projection 132 of bracket 130 aligns bracket 130 in place on bracket 80. Cam 120, which may be of a phenolic condensation product, hard rubber or other suitable insulating material, is rockable about pivot screw 121 which passes through clearance hole 122 in cam 120 and is threaded into hole 133 in bracket 130. Washer 123 is loosely held under the head of screw 121 to assist in aligning cam 120 substantially parallel to angular extension 88 of bracket 80.

As may be seen in Fig. 4, when a handset is placed on hook 90, finger 92 is rocked rearward, its lower end engages face 124 of cam 120, and rotates cam 120 counter-clockwise about its pivot screw 121, causing face 125 of cam 120 to engage downwardly projecting end 114 of one contact spring. Consequently, this spring and a companion spring end 113, flexed through insulating piece 126, move by an amount sufficient to interrupt contacts 115. When the handset is removed from hook 90, spring 104 presses finger 92 away from engagement with face 124 of cam 120 and the tension in flexed spring end portions 113, 114 moves cam 120 clockwise by engagement of spring end 114 with face 125 thereby closing contacts 115.

The wall mounting for a hand telephone of this invention has the advantages of small thickness of the mounting, a unitary assembly of the switchhook which facilitates manufacture, relief of tension on the flat type contact springs 113, 114 by means of the tension in spiral spring 104, and visibility of the contacts 115 which facilitates adjustment thereof.

While this invention has been disclosed with reference to a specific embodiment, it is to be understood that it is to be considered as limited in scope by the appended claims only.

What is claimed is:

1. A wall mounting for a hand telephone comprising a housing having a vertical wall provided with a pair of apertures aligned transversely with respect to said wall, mounting studs on the inner face of said wall, a hook member having a portion exterior to said housing for accommodating a hand telephone and having a pair of fingers extending through said apertures, one of said fingers having a portion within said housing extending substantially parallel to said face, and a unitary assembly within said housing and affixed to said studs, said assembly comprising a one-piece mounting plate having a pair of aligned arms each opposite a respective one of said apertures, a first flange extending substantially normal to said face and parallel to the line of alignment of said arms and a second flange to one side of said arms, a shaft extending between said arms, said fingers being rockably positioned on said shaft, contact springs mounted by said second flange and flexible in the direction parallel to said shaft, and a coupling member mounted upon said first flange and rotatable about an axis normal to said shaft, said coupling member having a pair of angularly related extensions one of which engages one of said contact springs and the other of which engages said portion of said one finger.

2. A wall mounting for a hand telephone comprising a housing having a vertical wall provided with a pair of apertures aligned transversely with respect to said wall, mounting studs projecting inwardly from the inner face of said wall, a unitary assembly in said housing including a mounting plate secured to said studs and spaced from said wall thereby, said plate having a pair of integral aligned arms extending therefrom toward said face and each adjacent a respective one of said apertures, said plate having also three integral flanges one of which extends toward said face below one of said arms, the second of which extends normal to said face and transversely with respect thereto and the third of which is to one side of the other of said arms and above the second flange, contact springs flexible in the direction transverse with respect to said face, mounted by the third flange and depending therefrom to opposite the second flange, a cam member mounted on said second flange and rotatable about an axis substantially parallel to said face, said cam member having an extension engaging one of said contact springs and a second extension projecting toward said face, a shaft extending between said arms, a hook member pivoted on said shaft and having a portion exterior to said housing for accommodating the hand telephone and a pair of fingers extending between said face and said plate, one of said fingers engaging said second extension and the other finger extending to opposite said one flange, and means including a spring separate from said contact springs and coupled between said plate and said hook member for rocking said member in the direction to move said fingers toward said face.

STANLEY T. CURRAN.
WALTER J. THAYER.

REFERENCES CITED

The following references are of record in the file of this patent:

UNITED STATES PATENTS

| Number | Name | Date |
|---|---|---|
| 2,343,442 | Bertalan | Mar. 7, 1944 |